United States Patent [19]

Kasten

[11] 3,737,036
[45] June 5, 1973

[54] FILTER FOR POLYMER PROCESSING AND METHOD OF MANUFACTURE

[75] Inventor: Walter Kasten, Franklin, Mich.

[73] Assignee: The Bendix Corporation, Southfield, Mich.

[22] Filed: Aug. 21, 1972

[21] Appl. No.: 282,088

Related U.S. Application Data

[63] Continuation of Ser. No. 67,113, Aug. 26, 1970, abandoned.

[52] U.S. Cl. ..................210/70, 29/163.5, 210/486, 210/DIG. 15
[51] Int. Cl. ..........................................B01d 37/00
[58] Field of Search..................210/70, 346, 347, 210/331, 483, 486, 489, 490, 492, 496, 499, 310, DIG. 15; 55/525, 526; 29/163.5

[56] References Cited

UNITED STATES PATENTS

| | | | |
|---|---|---|---|
| 2,423,547 | 7/1947 | Behlen | 210/499 |
| 2,552,305 | 5/1951 | Benedict | 210/346 |
| 2,792,122 | 5/1957 | Munch et al. | 210/489 X |
| 2,869,176 | 1/1959 | Wright | 210/489 X |
| 2,230,154 | 1/1941 | Anderson et al. | 55/526 X |
| 3,017,698 | 1/1962 | Hambrecht et al. | 29/163.5 |
| 3,261,474 | 7/1966 | Parker et al. | 29/163.5 |

Primary Examiner—John Adee
Attorney—John R. Benefiel

[57] ABSTRACT

A filter arrangement for a method of molten polymer processing is disclosed in which a plurality of filter elements are disposed in a filter cavity, with each element including filter surfaces aligned with the general direction of flow through the filter cavity, to thereby increase the effective filter surface area, and each element also including restrictive flow paths internally of the filter surface to maintain a relatively large pressure drop across the filter required for proper polymer processing in which conditioning of the molten polymer occurs to create long link molecules.

The method of manufacture includes the steps of assembling a sandwich of outer layers of a filtering mesh and inner layers of a coarser mesh, diffusion bonding the layers together, sealing the edges, cutting the resulting sandwich in half by an electro-discharge, electron beam, laser machining, or other suitable process, pressing the open edge of each half into a respective opening in a manifold plate, and bonding each half thereto. In a preferred version of the process, the sealing step is performed by compressing the edges under a degree of pressure necessary to create cold flow of the metal, sufficient to seal and bond the periphery thereof.

5 Claims, 7 Drawing Figures

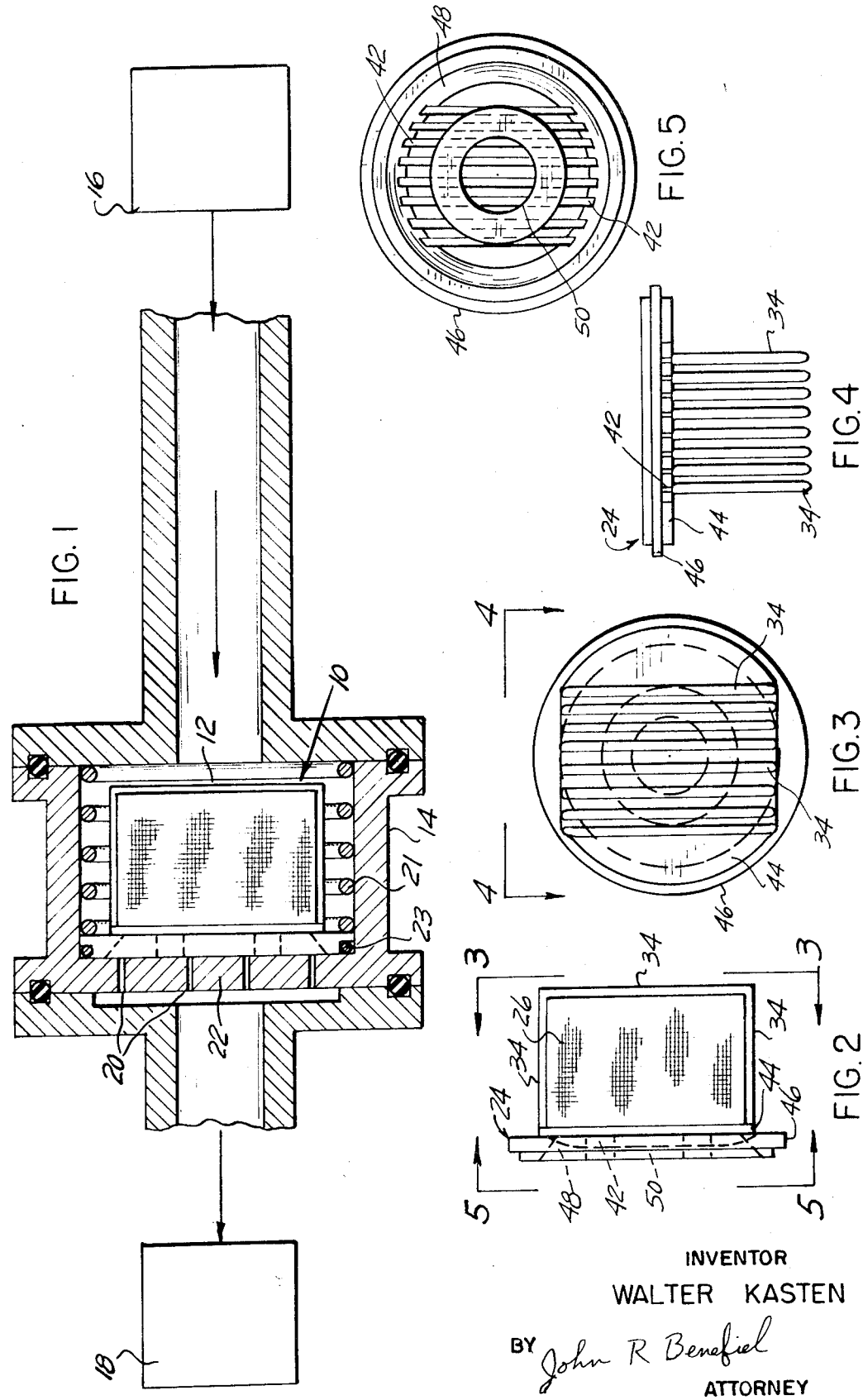

Patented June 5, 1973 3,737,036

STEP 1
STEP 2
STEP 3
STEP 4
STEP 5

INVENTOR
WALTER KASTEN
BY John R Benefiel
ATTORNEY

FILTER FOR POLYMER PROCESSING AND METHOD OF MANUFACTURE

This is a continuation of application Ser. No. 67,113, filed Aug. 26, 1970, now abandoned.

BACKGROUND OF THE INVENTION

1. Field of the Invention

This invention concerns filters and more specifically filters especially adapted for use in polymer processing operations.

2. Description of the Prior Art

In processing polymers such as are used in the manufacture of synthetic textile fibers, combination stacked metal screen and sand pack filters are used immediately upstream of the spinnerettes to remove solid contaminants from the molten polymer which if occluded in the extruded fiber will substantially weaken it possibly causing it to part.

This filter pack is also used to condition the polymer, as it has been found that passing it through a tortuous or restrictive path under a sufficiently high pressure differential encourages the formation of long link molecules rather than closed link molecules therein, in turn contributing to improved fiber strength.

The metal screen and sand filter arrangement, however, suffers from several disadvantages, the primary one being that since the contaminant deposits on the topmost layers of the screen and sandpack, pack life before pressure losses thereacross become excessive is short, on the order of three days for a typical installation.

Another disadvantage is the high cost of servicing these units, which is the result of the need for trained personnel to perform the assembly of the filter pack in the filter cavity, the separate screens and sandpacks being emplaced individually therein.

The solution to the service life problem is aggravated by need for the conditioning function performed by the filter pack: If a simple increase in cross section area of the filters is attempted, the time of residence in the filter increases, and the rate of movement of the molten polymer through the interstices declines, to the point that the conditioning process no longer occurs.

Therefore, it is an object of the present invention to provide an effective filter which has a relatively long service life and across which a relatively high pressure differential occurs during the filtering action, sufficient to condition polymers in the manner described, and a process of filtering and conditioning molten polymers using such a filter.

It is a further object to provide such a filter which is readily and quickly emplaced by unskilled labor.

Yet another object is to provide a method of manufacturing the filter element used in the filter of the present invention.

SUMMARY OF THE INVENTION

These objects and others which will become apparent upon a reading of the following specification and claims is accomplished by providing a plurality of filtering elements disposed in a filter cavity, each filter element composed of an outer layer of a porous filter mesh extending over one or more inner layers of mesh to form a sandwich, each of the filtering elements so formed disposed in a manifold plate with an open thin edge communicating with the outlet and its major surface area disposed aligned with the general direction of the flow in order to provide a large effective filtering area, while at the same time yielding a relatively large pressure drop thereacross since the flow path through the filter element to the outlet is through the relatively thin cross section of the core, and also as a result of the restrictive effect of the core mesh on flow.

The method of manufacture includes the steps of assembling the layers of outer and inner mesh, bonding them together by sealing the entire outer edge of the assembly, cutting the assembly in half by means of an electro-discharge, laser beam, or electron beam, and pressing the cut edge of each half into a manifold plate with a subsequent bonding thereto. In a preferred version of the sealing step, compression of the edges sufficient to cause cold flow of the metal is used to bond and seal the edges.

BRIEF DESCRIPTION OF THE DRAWINGS

FIG. 1 is a partially sectional view of a typical installation of a filter assembly according to the present invention, together with a schematic representation of the associated polymer processing equipment.

FIG. 2 is a detailed view of the filter assembly depicted in FIG. 1.

FIG. 3 is a view in the direction of line 3—3 of the filter element shown in FIG. 2.

FIG. 4 is a view in the direction of line 4—4 of the filter element shown in FIG. 3.

FIG. 5 is a view in the direction of the line 5—5 of the filter element shown in FIG. 4.

DETAILED DESCRIPTION

Figure 6:
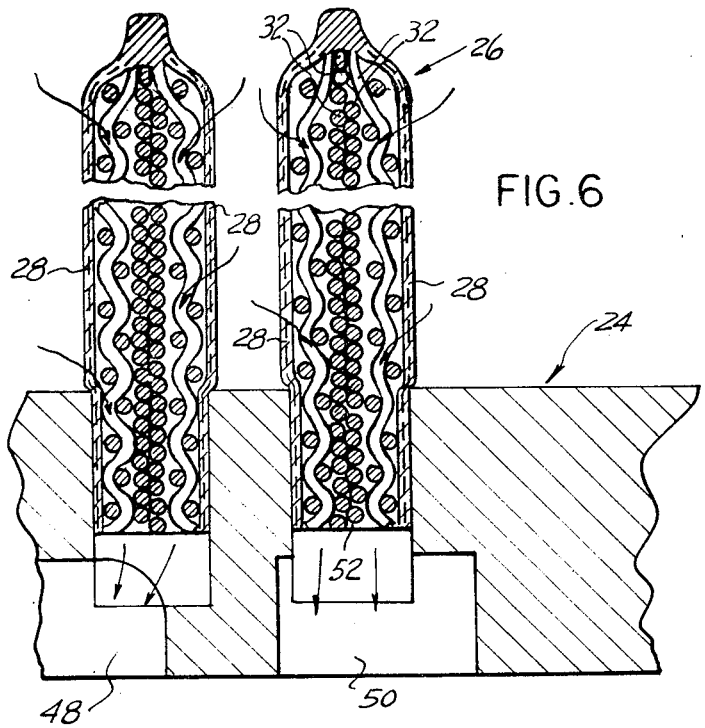
FIG. 6 is a partial enlarged view of the section taken along the line 6—6 in FIG. 2.

In the following detailed description, certain specific terminology will be utilized for the sake of clarity and a specific embodiment described in order to provide a complete understanding of the invention, but the invention is not so limited and may be carried out in a variety of forms and embodiments.

Referring to the drawings, and particularly FIG. 1, the filter assembly 10 is depicted, located in a filter cavity 12 in a filter housing 14. The cavity 12 is located downstream of the source of the molten polymer 16 and upstream of the spinnerettes depicted schematically at 18. The polymer passes into the filter cavity 12, is filtered and conditioned by the filter assembly 10, and passes out the outlet openings 20 in the end wall 22 of the housing 14, to be carried to the spinnerettes 18, where the fibers are formed from the molten polymer.

In order to provide an initial seal before the system is pressurized, a compression spring 21 is provided, biasing the filter assembly 10 against the end wall 22, to compress a metal o-ring seal 23.

Referring to FIGS. 2-6, the filter assembly 10 is shown apart from the housing 14, and includes a manifold plate 24 and a plurality of filter elements 26 mounted thereto.

As shown in detail in FIG. 6, each filter element 26 is composed of an outer porous filtering layer 28 on each side, and an inner core 30 built up of a number of layers of coarser mesh 32, with the resulting sandwich sealed around the three outer edges at 34, by crimping, welding, sealing, or some other suitable process.

The porous outer layer 28 performs the filtering function, and hence must be of suitable material and size for the particular application. In a typical installation in a polymer processing situation an 165 × 800 stainless mesh, 0.008 inches thick with 17 micron openings was selected. Mesh of this and other similar suitable configurations are available commercially, and hence it is not felt necessary to describe it in detail.

The inner core 30 in conjunction with the filter layer 28 performs the polymer conditioning process by restricting the flow path defined by the two outer layers sufficiently to create the necessary minimum pressure drop thereacross, and hence the nature and configuration of the members making up the core 30 must be properly selected for each application.

For an actual application, in which a 1,600 psi minimum and 2,500 psi pressure drop maximum were required, a sandwich composed of two outer 60 × 60 screens 38, 0.015 inches thick and two inner 12 × 64 screens 40 (turned 90° to each other), 0.040 inches thick, yielded the necessary pressure drop characteristic.

The main core 30 also services the structural purposes of backing up the filter layer 28 and stiffening the filter element 26 for assembly into the manifold plate 24.

Each filter element 26 is pressed into a respective groove 42 cut across a raised portion 44 with each of the grooves arced downwardly into the base portion 46 to intercept one or the other or both of an outer annular outlet groove 48 or an inner outlet opening 50, so that the open bottom portion 52 of all of the filter elements 26 communicate with one or the other of these.

The annular outlet groove 48 and the outlet opening 50 in turn are arranged to register with the openings 20 in the filter housing 20 so as to complete the fluid circuit through the cavity 12.

In operation, the molten polymer enters the filter cavity 12, passes around and into the filter elements 26, through the inner core 30 into the grooves 42, and thence to the outlet groove 48 or opening 50 and finally to the outlets 20.

Since the outlet layers 28 are of a finer mesh than those composing the core 30, the contaminant is collected on the surface of the outer layers 28 while the polymer is conditioned by the combined restrictive effect of the outer layers 28 and the inner core 30.

The disposition of the major areas of filter parallel or aligned to the direction of flow through the cavity 12 increases the effective area many times, and for one particular application, the available filter area was increased from approximately 3 inches square to over 30 inches square.

At the same time, the area of the flow path through the filter cavity as a whole is not increased thereby, and thus, in combination with the substantial restrictive effect of the core 30, conditioning of the polymer will still occur.

In connection with this, it is noted that the polymer will flow into the core area up and down the height of each element 26, and the pressure drop across the element will be an average of that occurring at the lowermost portion and the topmost portion, and in order to fully condition the polymer without creating an excessive pressure drop, these values should be within minimum and maximum range allowed in the particular application.

Since the filtering action takes place on the surface of the filter element 26, the assembly is readily cleaned for reuse, and as the filter assembly 10 is a unitary structure it may be easily replaced by unskilled labor, hence contributing to lowered maintenance and service costs.

From the above description of the operation of the device, it can be seen that the filtering and conditioning functions, while still performed by a single element, are performed in two different modes of flow: the filtering action takes place during flow through the outer filter layer, all about the relatively large area of the surface thereof, while the conditioning mode takes place primarily during the mode of flow downward through the core, a relatively small area.

This is contrasted to the prior art discussed above, in which both the filtering and conditioning action took place in the same mode of flow — with the inherent problem of how to increase the filter surface area to increase service life without reducing the pressure differential thereacross for a given flow rate to a value below the minimum necessary for successful conditioning.

Figure 7:
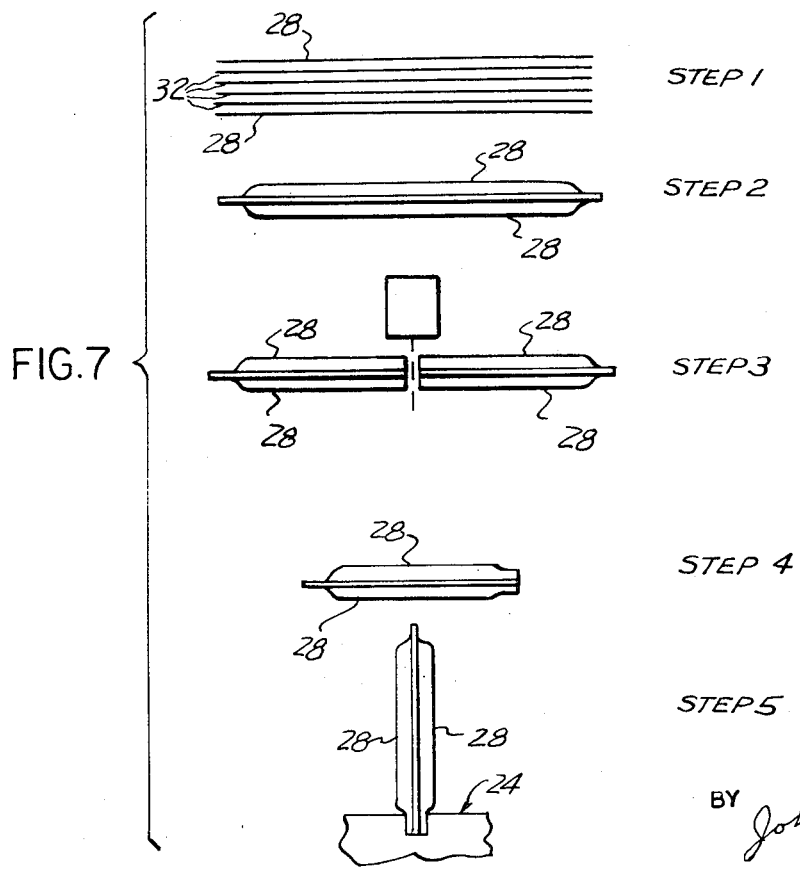
FIG. 7 is a flow sheet diagrammatically indicating the steps in manufacturing the filter element depicted in FIGS. 2 through 6.

Referring to FIG. 7, a process of manufacturing the filter element 26 is depicted schematically. In step 1, the various layers are assembled to form a sandwich trimmed to size, and then diffusion bonded together.

In step 2, the edges are sealed about the entire periphery by a suitable process, i.e., welding, sealing by soldering, brazing, etc., sufficiently to withstand the pressure differential expected to be experienced by the element.

In connection with this last step, it has been found that compressing the outer edges of the sandwich under sufficient pressure, cold flow of the metal will occur, filling the interstices, bonding and sealing the edge thereof, without the need for welding, brazing or cementing. This effect is depicted in the filter elements shown in FIG. 6. This approach will produce a sound bond at a low cost, and is susceptible to high volume production methods involving die forming of the peripheral edges.

In step 3, the sandwich is severed in half, preferably by an electro-discharge machine, so that burring and crushing of the edges is minimized, and flow through the resulting opening will be substantially unhindered. Alternatively, an electron beam or laser machining process could be used.

In step 4, the cut edge is compressed slightly and in step 5, each half portion is press fitted into a respective slightly undersized slot in the manifold plate, and subsequently secured thereto by diffusion bonding, welding, etc., so that the joint is capable of withstanding the expected pressure differential without leakage.

As can be readily appreciated, this method provides an efficient and expeditious construction of the individual filter elements without wastage.

While a specific embodiment has been described in order to provide a more complete understanding of the invention, many variations thereof are possible within the scope of the invention. For example, the flat sandwich type of configuration of the filter element shown, while a preferred configu-ration, could be modified to a cylindrical or other such shape while retaining its essential characteristic. Furthermore, the construction of the core, i.e., a built-up sandwich, could be varied to provide an alternate restrictive flow path such as a porous unitary element, of the proper configuration.

Finally, the filter assembly, while offering particular and substantial advantages in the context of polymer processing, could be used in any other context in which a relatively large pressure drop across a large effective area filter is desired.

What is claimed is:

1. A method of manufacturing a filter element comprising the steps of:
    assembling lower and upper filter layers with at least one layer of mesh in between;
    sealing the resulting sandwich about its periphery;
    cutting the sandwich into sections having at least one unsealed edge;
    pressing the unsealed edge of each portion into a slotted manifold plate.

2. The method of claim 1 wherein the cutting step includes electro-discharge severing of the sandwich, whereby a smooth opening for flow through the opening formed by said cutting step is provided.

3. The method of claim 1 wherein the sealing step includes the step of compressing the outer edges of said sandwich to cause cold flow of the filter layer and mesh material to thereby substantially seal the periphery of said sandwich.

4. A process of filtering and conditioning molten polymer material prior to fiber spinning comprising the steps of:
    filtering the molten polymer by passing it through an outer porous filtering layer;
    conditioning the molten polymer to create formation of long link molecules by subsequently passing the molten polymer through a restrictive flow path, enclosed at least in part by said outer porous filtering layer and in a direction wherein the flow path cross-sectional area is substantially less than that of the outer porous filtering layer filtering area, whereby filtering is carried out in a substantially larger flow area than the condi-tioning occurring in said restrictive flow path while both are carried out within the space occupied by said outer porous filtering layer.

5. The method of claim 4 wherein in said subsequent passing step said polymer is passed through a core element surrounded by said porous filtering layer so as to be disposed in said flow path and having numerous openings therein coarser than said outer porous filtering layer pores, whereby filtering takes place solely on the outer surface of said outer porous filtering layer.

* * * * *